United States Patent [19]
Pantzar et al.

[11] Patent Number: 5,447,396
[45] Date of Patent: Sep. 5, 1995

[54] CUTTING INSERT WITH TWISTED RELIEF SURFACE

[75] Inventors: Göran Pantzar, Arsunda; Per Nilsson; Magnus Aspeby, both of Sandviken, all of Sweden

[73] Assignee: Sandvik AB, Sweden

[21] Appl. No.: 185,001

[22] Filed: Jan. 24, 1994

[30] Foreign Application Priority Data

Jan. 27, 1993 [SE] Sweden ................... 9300233

[51] Int. Cl.$^6$ .......................................... B23C 5/02
[52] U.S. Cl. .............................. 407/113; 407/116
[58] Field of Search .......................... 407/113, 116

[56] References Cited

U.S. PATENT DOCUMENTS

| | | |
|---|---|---|
| 4,632,607 | 12/1986 | Pantzar . |
| 4,940,369 | 7/1990 | Aebi et al. ................ 407/42 |
| 5,044,840 | 9/1991 | Fouquer et al. .......... 407/114 |
| 5,052,863 | 10/1991 | Satran ...................... 407/113 |
| 5,071,292 | 12/1991 | Satran ...................... 407/116 |
| 5,145,295 | 9/1992 | Satran ...................... 407/113 |
| 5,199,827 | 4/1993 | Pantzar . |

FOREIGN PATENT DOCUMENTS

| | | |
|---|---|---|
| 0555192 | 8/1993 | European Pat. Off. . |
| 456564 | 10/1988 | Sweden . |
| 646691 | 5/1991 | U.S.S.R. . |

OTHER PUBLICATIONS

Derwent Abstract 92-031 445/04 which corresponds to Soviet Union 646 691.

*Primary Examiner*—Jack W. Lavinder
*Attorney, Agent, or Firm*—Burns, Doane, Swecker & Mathis

[57] ABSTRACT

A cutting insert, preferably for milling cutters, comprises an upper side or chip surface, a bottom surface and side surfaces extending between the upper and bottom surfaces. At least one of the side surfaces having a relief surface adjacent to a cutting edge, which relief surface is helically twisted along the cutting edge so that the relief or clearance angle decreases with increasing cutting depth. This arrangement makes it possible to obtain an equally large clearance along the cutting edge even with a negative inclination of the cutting insert in the milling cutter body.

8 Claims, 1 Drawing Sheet

CUTTING INSERT WITH TWISTED RELIEF SURFACE

BACKGROUND AND SUMMARY OF THE PRESENT INVENTION

The present invention relates to a cutting insert for chip forming machining, in particular milling cutters. The insert is produced by form pressing and sintering of an insert-forming powder. The insert comprises an upper chip surface, a lower, planar bottom surface which can be placed into abutment with a cooperating bottom support surface of the machining tool, and at least three side surfaces extending between the upper and bottom surfaces. At least one of the side surfaces adjoins the chip surface along a line that forms a cutting edge.

Such cutting inserts are more and more made by a direct-pressing method during which a cemented carbide forming powder first is shaped into desired form in a suitable pressing tool and then is given final strength by sintering in an oven at temperatures above 1000° C. The pressing operation has been sophisticated over the years and is nowadays so well defined that the process provides good possibilities for forming the cutting edge and adjacent chip forming surfaces and possible reinforcing chamfers and clearance surfaces with great exactitude. Moreover, shrinkage occurring during the process is taken into account during the dimensioning of the pressing tool.

Today's cutting geometries tend to be more and more positive, i.e., larger and larger angles between the chip or rake surface of the insert and the normal to the machined surface. The reason for this geometry is that several advantages are achieved, such as a small cutting force and thus a low energy consumption, a well defined cutting edge for high measure precision, and a wider liberty when selecting the relief angle while maintaining a positive cutting geometry. In practice, the limit for the positivity of the angle of the chip surface is determined by the strength of the cemented carbide, since the edge angle becomes sharper, and thus weaker, the more positive the angle of the chip surface is.

In some circumstances, a negative axial inclination of the cutting insert in the milling cutter body can be advantageous, although the effective rake angle against the work piece is kept positive. This arrangement is often the case at the machining of cast iron, in particular in the motor industry, but the arrangement may also be advantageous for steel machining. Negative axial inclination angles are mainly used in end mills with small diameters. The negative inclination angle makes it possible to attain cutting inserts with up to eight cutting edges. The magnitude of the inclination can be up to 15°.

Also the clearance plays a decisive role at all cutting machining operations. In order to guarantee a sufficient free space in relation to the work piece, it is not permissible that too large a part of the clearance of relief surface behind the cutting edge in the cutting direction be in contact with the work piece. Insufficient clearance quickly results in a higher degree of face wearing and vibrations, and also in chipping and breakage of the cutting edge.

A negative inclination entails that the clearance of a plane relief surface increases with increasing cutting depth. Thereby, vibration problems occur at sharp (up to 90°) new cutting edges before these have been "run in", i.e., before they have been submitted to a certain initial wear on the outermost cutting edge. Therefore, it is common practice for the machine operator to hone the new cutting edges to thereby increase the support surface and lower the vibration tendency at start up.

A first object of the present invention is to form a relief surface of a cutting insert in such a way that the clearance can be adjusted to an optimal level at different cutting depths at negative axial inclination of the cutting insert in the milling cutter body.

A second object of the present invention is to maintain a substantially equal clearance along the cutting edge at negative axial inclination of the cutting insert in the milling cutter body.

A further object of the present invention is diminish, or even eliminate, the initial vibration tendencies at start up with completely new cutting edges.

These and other objects have been achieved by the present invention by providing a relief surface between two cutting corners which is helically twisted in such a way that the clearance (or relief angle) decreases with increasing cutting depth.

Indexable cutting inserts with twisted relief surfaces are previously known per se, see for instance EP-A-239 045 and EP-A-392 730. However, the relief surfaces of these inserts are twisted in a direction opposite to that of the present invention, i.e., the twist provides that the clearance increases with increasing cutting depth. Therefore, these prior art arrangements are not at all suitable for providing an insert that can be arranged inclined axially negatively in the milling cutter body. Moreover, these known cutting inserts also have a helically twisted chip surface in order to form a basically constant edge angle along the whole main cutting edge. However, that form results in the inconvenience of reducing the edge angle, which in turn can cause chipping and breakage of the cutting edge.

BRIEF DESCRIPTION OF THE DRAWINGS

For illustrative but non-limiting purposes, the invention will now be more closely described in connection with a preferred embodiment according to the appended drawings, wherein like members bear like reference numerals, and wherein.

DETAILED DESCRIPTION OF THE PREFERRED EMBODIMENT

Figure 1:
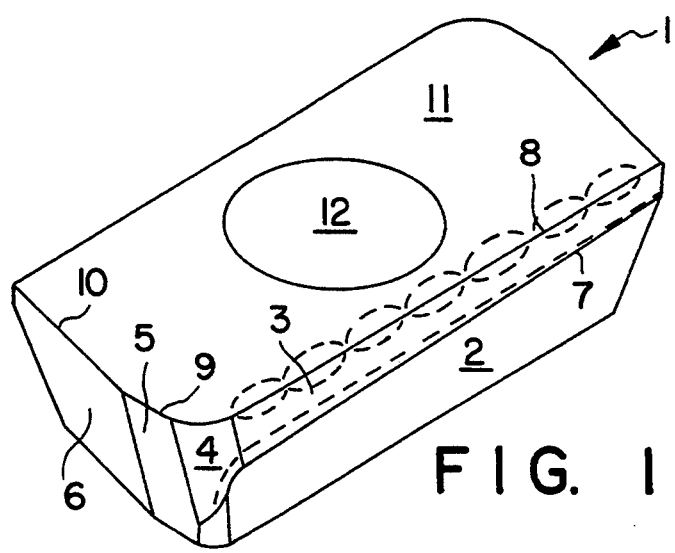
FIG. 1 is a perspective view of the cutting insert according to the present invention.
Figure 2:
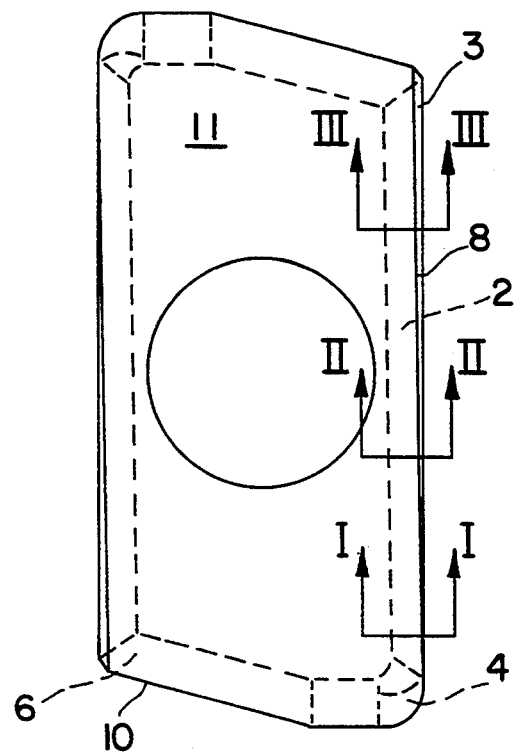
FIG. 2 is a top view of the cutting insert according to the present invention.

With reference to FIG. 1, an indexable cutting insert 1 has a rectangular or slightly rhombic basic form. The angle between the plane face 5 and the surface 6 is suitably between 160° and 179.5°. The insert comprises a substantially planar chip surface or upper side surface 11 and a bottom surface that is plane-parallel with the surface 11, and side or relief surfaces 2, 3, 5 and 6 extending between the upper surface and the bottom surface. The twisted relief surface 3 according to the present invention adjoins upwardly to the main cutting side 8 and downwardly to the lower relief surface 2 along a break line 7. Because of the twisted shape of relief surface 3, a certain curvature may be conferred to the break line.

An operative cutting corner 4 is smoothly rounded and connects in one direction to the main cutting edge 8 and in the other direction to a secondary cutting edge 9. In a manner known as such, the main cutting edge 8 cuts chips out of the work piece, while the secondary cutting edge 9 creates the new surface on the work piece. In practice, edge 10 has no cutting function.

Figure 3A:
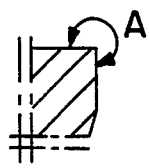
FIGS. 3a, 3b and 3c are cross-sectional view taken along lines I—I, II—II and III—III, respectively, in FIG. 2.
Figure 3B:
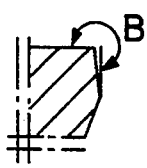
Figure 3C:
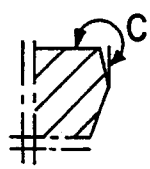

Depending upon how inclined the cutting insert is arranged in the milling cutter body, the primary relief surface 3 can be twisted to different degrees. According to FIG. 3a, the relief or clearance angle nearest the operative cutting corner can be 0°; however, it can be up to 10°, preferably up to 5°. At the middle of the main cutting edge, the negative relief angle B can be between 5° and 15° (FIG. 3b). At maximal cutting depth, the negative relief or clearance angle C can be between 15° and 20° (FIG. 3c). As seen in FIGS. 3a, 3b, and 3c, respectively, outside angles A, B, and C, respectively, formed between the relief surface 3 and the upper surface 11 decrease with increasing cutting depth.

Alternatively, the relief angle nearest to the operative cutting edge can also be positive, i.e., the relief surface 3 forms an acute angle with the upper side 11. The essential issue is that the inventive concept is obeyed, i.e., that the clearance angle diminishes with increasing cutting depth. Thus, if the relief or clearance angle nearest to the operative cutting corner has a value of +15°, this can decrease to about 0° at maximal cutting depth. Suitably, a total twist of between 10° and 20°, preferably between 12° and 18°, is formed along the length of the relief surface 3.

The shape of the upper side 11 does not constitute an essential feature of the present invention. Preferably, the rake angle is substantially constant along the whole or at least a major part of the main cutting edge. In order to decrease the cutting forces, the upper surface can, for instance, be formed with dimples or recesses along the cutting edge. Since the presence of such recesses cause the edge angle to decrease at the dimples or recesses, then the relief surface 3 should be formed, still according to FIGS. 3a to 3c with the aim of not further weakening the cutting edges by an acute angle between the upper side surface 11 and the relief surface 3 in the proximity of the operative cutting corner.

According to a modification of the present invention, the twisted relief surface 3 can also be formed with a substantially constant width along the cutting edge. Thus, in this case the break line 7 is parallel to the cutting edge 8. However, in order to accomplish this geometry the secondary relief surface 2 also has to be formed with a helically twisted shape, whose direction of twist is opposite to the twist direction of the relief surface 3.

Preferably, the insert according to the present invention is provided with a central through-hole 12, for the insertion of a suitable clamping means, such as a screw, a locking pin or similar.

Of course, the invention is not limited solely to the embodiment illustrated in the drawings and described above. Thus, it is also possible to use the invention on other polygonal forms than rectangular or rhombic, e.g., on square, rhomboidic or triangular inserts. Moreover, it should be pointed out that the insert does not necessarily have to have two relief surfaces on every side surface. Hence, the twisted relief surface according to the invention can also cover an entire side surface, from the upper surface 11 down to the bottom surface.

The chip or rake surface 11 can be provided with different chip breaking arrangements known per se, for instance ridges, bumps, dimples, other recesses, etc.

According to the described embodiment, the main cutting edge is straight throughout the length. However, it can also be slightly curved outwards, in order to compensate for the negative axial inclination of the insert in the milling machine and to further guarantee full planarity of the milled surface.

The principles, preferred embodiment and mode of operation of the present invention has been described in the foregoing. However, the invention which is intended to be protected is not limited to the embodiments disclosed but, rather, is defined by the appended claims. Therefore, variations and changes may be made that fall within the scope of these claims.

What is claimed is:

1. A milling cutting insert for chip forming machining tools, comprises an upper chip surface, a lower, planar bottom surface which is adapted to be placed in abutment with a cooperating support surface of the machining tool, at least three side surfaces extending between said two surfaces, at least one of the side surfaces adjoining the chip surface along a line that forms a cutting edge, said at least one side surface having a relief surface adjacent to the cutting edge, the relief surface being helically twisted such that an outside angle formed between the relief surface and the upper surface decreases with increasing cutting depth.

2. The insert according to claim 1, wherein the total twist of the relief surface is between 10° and 20°.

3. The insert according to claim 2, wherein the cutting edge is provided with recesses.

4. The insert according to claim 1, wherein a portion of the upper surface adjacent the cutting edge forms an angle with a remaining portion of the upper surface, the angle between the portion of the upper surface and the remaining portion of the upper surface being substantially constant along at least a major portion of the cutting edge.

5. The insert according to claim 4, wherein the break line is straight.

6. The insert according to claim 4, wherein the break line is curved.

7. The insert according to claim 1, wherein the insert is produced by form-pressing and sintering an insert forming powder.

8. The insert according to claim 1, wherein a rake angle of a surface adjacent the cutting edge relative to the upper surface is substantially constant along at least a major portion of the cutting edge.

* * * * *